Feb. 21, 1967  C. A. DIXON, JR  3,304,770
STRAW BENDING DEVICE

Filed Jan. 25, 1966  2 Sheets-Sheet 1

INVENTOR.
Charles A. Dixon, Jr.

BY Harry M. Saragovitz
Edward J. Kelly
Herbert Berl
ATTORNEYS

Feb. 21, 1967 C. A. DIXON, JR 3,304,770
STRAW BENDING DEVICE
Filed Jan. 25, 1966 2 Sheets-Sheet 2

INVENTOR.
Charles A. Dixon, Jr.

BY Harry M. Saragovitz
Edward J. Kelly &
Herbert Berl
ATTORNEYS 3,304,770
STRAW BENDING DEVICE
Charles A. Dixon, Jr., Frederick, Md., assignor to the United States of America as represented by the Secretary of the Army
Filed Jan. 25, 1966, Ser. No. 522,994
1 Claim. (Cl. 73—100)

This application is a continuation-in-part of application 350,617, filed Mar. 9, 1964, now abandoned.

The invention described herein may be manufactured and used by or for the Government of the United States of America for governmental purposes without the payment to me of any royalty thereon.

This invention relates to an apparatus for determining the physical characteristic of straw.

Present day harvesting procedure for cereals, such as wheat, barley, oats, etc., are highly mechanized and require that the plant stand substantially erect. Various diseases affect the ability of the plant to stand substantially erect, e.g., certain types of fungus such as rusts, root and lower stem infections, cause the plant to droop at maturity due to the burden of the weight of the grain upon the weakened stem. A weakened stem may result in the grain touching the ground where it may become wet and subject to mold. In addition, an excessively drooping plant may also inhibit the effective operation of mechanical harvesters. The present invention provides an apparatus for the obtaining of measurements of various physical strength characteristic of straws. The results obtained may be correlated with the subsequent biological history of the crop and thus form a basis for crop assessment.

It is a primary object of the invention to provide and disclose an apparatus for the measurement of the physical characteristics of straw.

It is a further object of the invention to provide and disclose an apparatus for the determination of the diameter of straw.

It is a further object of the invention ot provide and disclose an apparatus for the determination of the bending resistance of straw.

It is further object of the invention to provide and disclose an apparatus for the determination of the breaking resistance of straw.

It is a further object of the invention to provide and disclose an apparatus for the determination of the crushing resistance of straw.

Figure 1:
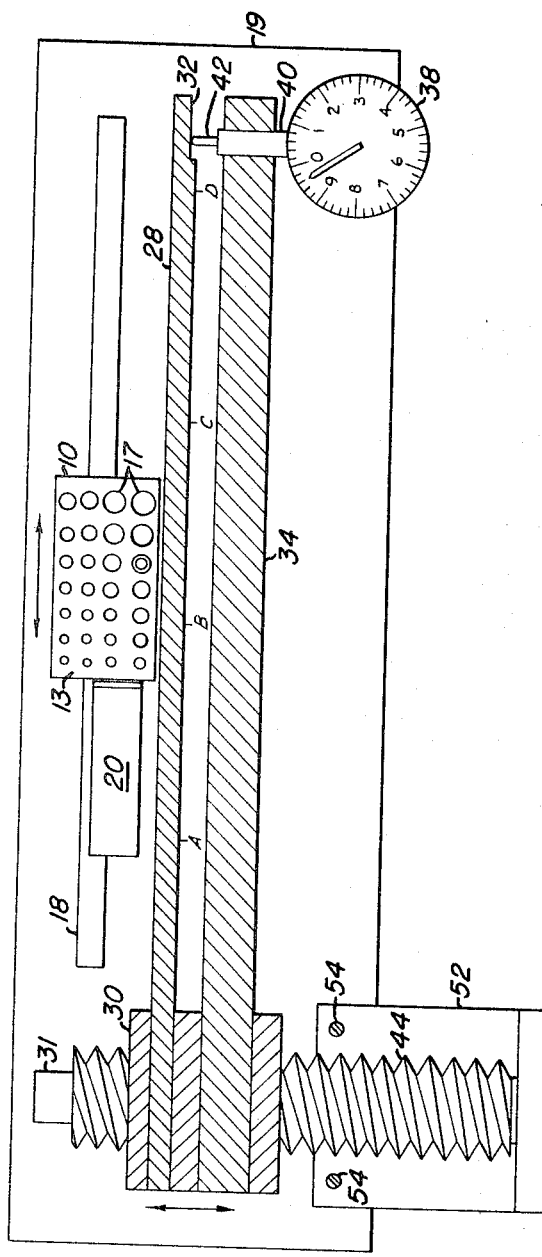
Figure 2:
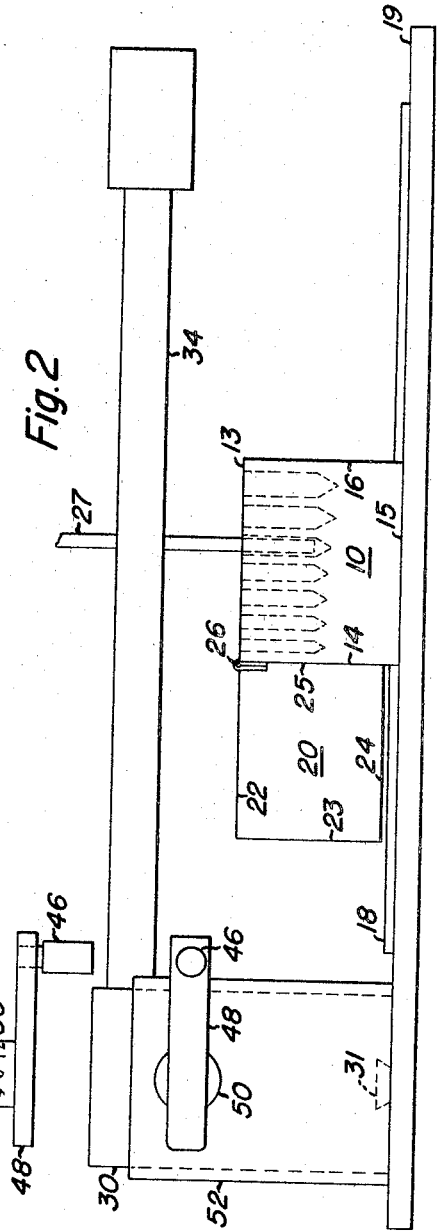
Figure 3:
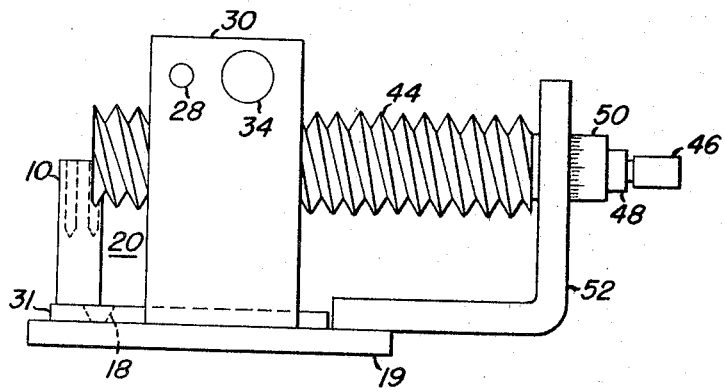
Figure 4:
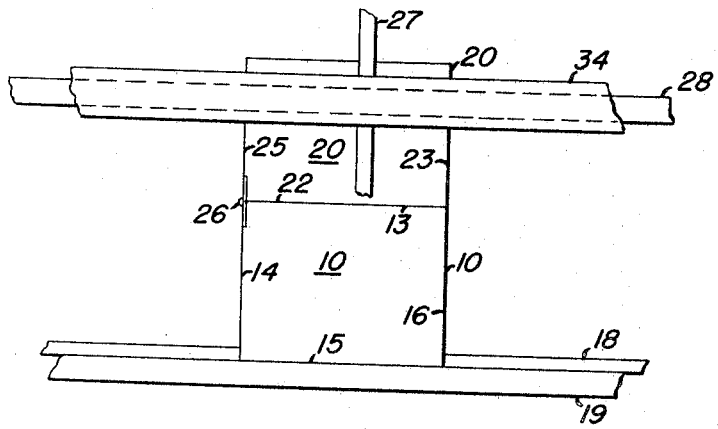
Figure 5:
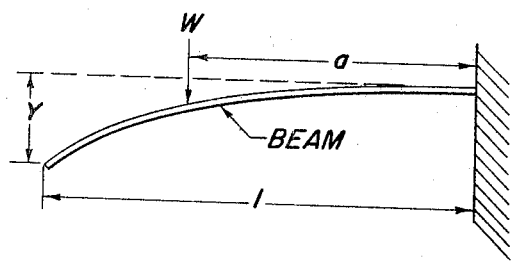

Other objects and a fuller understanding of the invention may be had by referring to the following description and claims taken in conjunction with the accompanying drawing in which:

FIG. 1 shows a top view of the apparatus.
FIG. 2 shows a side view of the apparatus of FIG. 1.
FIG. 3 shows an end view of the apparatus of FIG. 1.
FIG. 4 shows a partial side view of the apparatus of FIG. 1 with the anvil in operating position.
FIG. 5 represents a mathematical model illustrating the theory of the present invention.

Referring now to FIGS. 1 and 2, the apparatus comprises a straw holder 10, which consists of a rectangular shaped block having a top portion 13, bottom portion 15 and side portions 14 and 16. Straw holder 10 may be constructed of any suitable material, e.g., wood, plastic or metal. Positioned on the surface of top portion 13 of straw holder 10 are several rows of parallel positioned holes 17. Each row of holes comprises a constant depth of about one inch having an orderly progression of diameters so as to encompass all straw diameter of interest within the range thereof, e.g., one-eighth to one-quarter inch. The bottom portion of straw holder 10 comprises a slot in the center position, not shown, extending laterally from end to end thereof. The slot is suitably contoured to be compatible with dove tail guide 18. Straw holder 10 is laterally maneuverable along the entire length of dove tail guide 18, which is supported on base 19, comprising a rectangular shaped support constructed of any suitable material, e.g., wood or metal. Positioned immediately adjacent to straw holder 10 is anvil 20 comprising a rectangular shaped block of metal. Anvil 20 comprises top portion 22, bottom portion 24, and side portions 23 and 25. Anvil 20 is connected to straw holder 10 by means of hinge 26, which comprises a common double-leaf hinge with each of the leaves secured to abutting side portions 25 and 14 of anvil 20 and straw holder 10, respectively, as shown in FIG. 4. Anvil 20 is positioned adjacent to straw holder 10 while not in use, as shown in FIG. 2. Anvil 20 is put in use by the rotation thereof 180 degrees so that top portion 24 rests on top portion 13 of straw holder 10, as shown in FIG. 4. Located parallel to straw holder 10 in a plane slightly above thereof is flexible beam 28, which constitutes the sensing element of the apparatus. By way of example, a stainless steel beam of 0.187" diameter and 15 inches long has been found suitable. Flexible beam 28 is attached by means of an interference fit into the top portion of mounting block 30, which comprises a rectangular shaped metal object, e.g., steel. The bottom portion of mounting block 30 comprises a slot, not shown, analogous to the slot found on straw holder 10 and suitably contoured to be compatible with dove tail guide 31. Dove tail 31 is attached to base 19 by any suitable means. The other end of flexible beam 28 comprises a reduced section 32.

Stationary beam 34 is located parallel to flexible beam 28, and is equal in length thereto, but of a diameter substantially in excess thereof. Stationary beam 34, which may be constructed of a material identical to flexible beam 28, is secured at one end to the top portion of mounting block 30 by means of an interference fit. To the other end of stationary beam 34 is attached an ordinary machinists dial gage assembly comprising face 38, stem 40 and activating pin 42. Stem 40 is positioned in a bore, not shown, at the extreme end of stationary beam 34 and secured by any suitable means, e.g., a set screw. Activating pin 42 is immediately adjacent to reduced section 32 of flexible beam 28.

Screw drive assembly 44, comprising handle 46, arm 48 and scale 50, is threadably connected to mounting block 30 at a position near the top section thereof, and supported by a bearing, not shown, in bracket 52, which comprises an L-shaped support, secured by means of bolts 54 connecting the bottom section thereof to base 19. Drive screw 44 is driven manually by handle 46. The rotation of drive screw 44 motivates mounting block 30 in a direction transverse of the movement of the straw holder 10 along dove tail guide 31. The movement of mounting block 30 is indicated in thousandths of an inch on scale 50.

Calibration of the device to measure the strength of straws in terms of force is based upon the equation found in "Formulas for Stress and Strain," by Raymond J. Roark, p. 100, case #2, third edition (1954), McGraw-Hill, New York, N.Y., for the deflection of a beam clamped at one end, and loaded at right angles to its axis which reads:

$$Y = \frac{1W}{6EI}(3a^2l - a^3)$$

where $W$ = load on beam by reaction of straw.
$Y$ = deflection of sensing beam tip at dial gage.
$E$ = modulus of elasticity of sensing beam.

$I$ = moment of inertia of sensing beam.
$a$ = distance from mounting block to point of application of load (e.g., point A, B, or C).
$l$ = length of unclamped portion of sensing beam.

FIGURE 5 illustrates the relationship of the above equation, wherein W is the load in pounds; $a$ is the distance from the clamped end to the point of the application of load in inches and $l$ is the length of the beam in inches. To calibrate beam 28, known forces are applied at selected points, duplicating the straw action. These points, e.g., A, B, C, and D, are selected in such fashion that the dial gage assembly will read in convenient units.

The manner of operation will now be described. In the measurement of the strength of a straw in accordance with the instant apparatus, straw 27 is placed in the smallest hole of straw holder 10 into which it will fit without being forced. The diameter of the straw is recorded as the diameter of the hole. The straw must be of sufficient length to extend from the bottom of the holder hole to a point of about one-half to one inch above flexible beam 28 in order to provide for bending slippage. In a specific illustration, the specimen of straw may be only about four inches in length, e.g., where hole 17 is one inch deep; the top surface of straw holder 10 is two inches below the plane of flexible beam 28; said beam is three-sixteenths of an inch in diameter; and straw 27 extends an additional one-half to one inch above the plane of flexible beam 28.

Straw holder 10 is then motivated laterally to a position parallel to the axis of flexible beam 28 by means of dove tail guide 18 until the straw is aligned with one of the calibrated points on flexible beam 28. Mounting block 30 is motivated in a direction transverse to the lateral movement of straw holder 10 by means of drive screw 44, thereby moving flexible beam 28 at right angles to the axis of the straw and for a distance sufficient for the beam to contact the straw. To measure the bending resistance of the straw, mounting block 30 is moved a preselected additional distance, e.g., one-half inch as indicated on scale 50, thus applying a stress on the straw. When under such stress, the straw exerts a restoring force on flexible beam 28, thereby bending the beam and registering a beam end deflection on face 38 of the machinist dial gage assembly. To measure the breaking point of the straw, mounting block 30 is further motivated by drive screw 44 until the straw breaks. The breaking of the straw is characterized on the dial gage by a steady increase in deflection until the straw breaks, at which time the dial gage drops back toward zero. The breaking strength is calculated from the maximum dial reading.

The straw always breaks at the surface of the holder hole and is otherwise practically undamaged. To measure the crushing resistance, straw 27 is removed from hole 10. Anvil 20 is rotated 180 degrees on hinge 26 so that top 22 of anvil 20 is positioned on top 13 of straw holder 10. The straw is held manually against anvil 20 in such position that flexible beam 28, when moved forward by the motivation of mounting block 30 and drive screw 44, will contact an undamaged portion of straw. Since the anvil is immovable, flexible beam 28 tends to crush the straw. The crushing resistance of the straw causes an increase in the dial gage reading similar to the reading obtained during the bending operations.

While the device disclosed has been described as being useful for testing the physical properties of cereal straws, it is obvious that it could be employed for testing other similar hollow or solid cylindrical objects such as soda straws, metal tubing, etc.

Although I have described my invention with a certain degree of particularity, it is understood that the present disclosure has been made by way of example and that numerous changes in the detail of construction and arrangement of parts may be resorted to without departing from the spirit and scope of the invention, e.g., by proper selection of flexible beam material, beam cross section and beam length, the apparatus of the instant invention is adaptable to a wide range of force measurements encompassing milligrams to kilograms. In addition, the positions of the applied force and dial gage may be reversed, in which case a small force would produce deflections at the end of the beam and the reading kept small.

I claim:

An apparatus for measuring the physical properties of straws comprising a straw holder, guide means therefor, the straw holder being maneuverable along said guide means, a flexible beam movable at right angles to the axis of a straw contained in said holder, means for moving the beam against said straw and means for measuring the tip bending of said beam as its motion is opposed by the straw, said straw holder comprising a block having a plurality of constant depth holes of varying diameter therein for holding the straw and measuring its diameter.

References Cited by the Examiner

UNITED STATES PATENTS

| 2,583,885 | 1/1952 | Russenberger | 73—103 |
| 2,891,399 | 6/1959 | Rufolo | 73—141 X |
| 3,194,063 | 7/1965 | McKean | 73—100 |
| 3,195,348 | 7/1965 | Marshall | 73—100 |

FOREIGN PATENTS

| 880,955 | 6/1953 | Germany. |

RICHARD C. QUEISSER, *Primary Examiner.*

J. J. SMITH, *Assistant Examiner.*